US012428771B1

(12) United States Patent
Hoefling

(10) Patent No.: US 12,428,771 B1
(45) Date of Patent: Sep. 30, 2025

(54) APPLIANCE DOOR VENTILATING SCREEN ASSEMBLY

(71) Applicant: Tracy Hoefling, Bratenahl, OH (US)

(72) Inventor: Tracy Hoefling, Bratenahl, OH (US)

( * ) Notice: Subject to any disclaimer, the term of this patent is extended or adjusted under 35 U.S.C. 154(b) by 612 days.

(21) Appl. No.: 17/514,132

(22) Filed: Oct. 29, 2021

Related U.S. Application Data

(60) Provisional application No. 63/106,939, filed on Oct. 29, 2020.

(51) Int. Cl.
*D06F 39/14* (2006.01)
*D06F 39/06* (2006.01)
*E06B 5/00* (2006.01)

(52) U.S. Cl.
CPC .............. *D06F 39/14* (2013.01); *D06F 39/06* (2013.01); *E06B 5/00* (2013.01)

(58) Field of Classification Search
CPC ............. D06F 39/14; D06F 39/06; E06B 5/00
See application file for complete search history.

(56) References Cited

U.S. PATENT DOCUMENTS 5,992,675 A * 11/1999 Kerr ...................... A47J 36/064 220/370
11,738,373 B2 * 8/2023 Collins ..................... F24F 3/16 134/18
2013/0152641 A1 * 6/2013 Carrillo ................. D06F 37/266 68/12.26
2018/0000287 A1 * 1/2018 Backus ............... A47J 37/1285
2019/0136593 A1 * 5/2019 McCallister ............ D06F 39/14

FOREIGN PATENT DOCUMENTS

CS 226062 B1 * 3/1984
EP 2785907 B1 * 8/2015 ............. D06F 37/10
WO WO-2005121437 A1 * 12/2005 ............. D06F 58/22

OTHER PUBLICATIONS

Washing Machine [Front & Back], 2015, WordPress chrome-extension://efaidnbmnnnibpcajpcglclefindmkaj/https://qamplify.files.wordpress.com/2015/12/washing-machine-front-back.pdf (Year: 2015).*
Stop Moldy Washing Machine Odors with Smell-Stopper, 5 pps., Jan. 15, 2021.
A.J.A. & More Prop-A-Door for Front Load Washer—Magnetic Washing Machine Door Holder (Amazon), 2 pps., Date Unknown.
Safety 1st Prograde Front Loader Washer/Dryer Lock (Amazon), 1 pps. Date Unknown.
Safe and Shut Washer and Dryer locking Strap (Amazon), 1 pps., Date Unknown.

* cited by examiner

*Primary Examiner* — Steven B McAllister
*Assistant Examiner* — Michael James Giordano
(74) *Attorney, Agent, or Firm* — Lippes Mathias LLP

(57) ABSTRACT

A venting apparatus is provided to vent an associated appliance such as a washing machine. The venting apparatus includes a frame dimensioned to fit over an associated opening to the associated appliance cavity. A perforated screen is secured to the frame and dimensioned to substantially cover the associated opening when the frame is fit over the associated opening of the associated appliance cavity.

14 Claims, 8 Drawing Sheets

APPLIANCE DOOR VENTILATING SCREEN ASSEMBLY

This application claims the priority benefit of U.S. provisional Ser. No. 63/106,939, filed Oct. 29, 2020, the entire disclosure of which is expressly incorporated herein by reference.

BACKGROUND

This invention relates to an apparatus and method of venting an associated appliance such as a washing machine.

Washing machines have an inherent tendency to emit an unpleasant odor as a result of the door being closed when the washing machine is not in use. This is typically due to mold growth, for example, along a door liner where moisture collects inside the washing machine. Traditional odor controlling solutions oftentimes use door-propping apparatuses. These apparatuses prop the door open to a limited degree and thereby allow air flow to an interior cavity of the washing machine. These door-propping apparatuses are problematic for many reasons. First, these types of apparatus limit the amount of air flow by propping the door to a limited degree associated with the washing machine. Also, known door-propping apparatus do not provide a barrier preventing foreign objects, such as pets, from being able to get inside the washing machine.

A need exists for an improved arrangement that overcomes these existing problems and provides at least one or more of the above-described features, as well as still other features and benefits.

SUMMARY

The present invention is directed to an apparatus and method of venting an associated appliance that allows ventilation through the door by covering the door with an apparatus (venting apparatus or screen assembly) that may be made of a variety of materials and that improves airflow, and in some instances allows maximum airflow, to an interior cavity of the appliance, More particularly, the associated appliance is a washing machine that has a housing with a cavity formed therein and accessible via an opening in the housing. The washing machine has a door dimensioned to cover the opening wherein the door selectively permits access to the cavity in a door open position. The door prevents access to the cavity in a door closed position that satisfies these needs.

The venting apparatus preferably has a frame dimensioned to fit the opening to the cavity of the washing machine. A perforated screen is secured to the frame and dimensioned to substantially cover the opening when the frame is fit over the opening of the washing machine that accesses the cavity. A mounting member may be advantageously secured to at least a portion of the frame to removably secure the frame of the venting apparatus to the washing machine.

The mounting member may be configured to selectively secure the venting apparatus to the washing machine housing at a first location that covers the opening.

In another preferred embodiment, the mounting member may be configured to selectively secure the venting apparatus to the washing machine housing at a second location or storage location spaced from the opening when the venting apparatus is not in use.

The mounting member may include at least one magnet secured to the frame that removably mounts the venting apparatus to the housing.

The mounting member may include at least one magnet that secures the frame to the washing machine housing adjacent the a door seal.

The frame may be dimensioned for receipt over the washing machine opening and also advantageously prevents the door from closing over the opening. This allows air to flow into and out of the washing machine when the frame is mounted to the housing at a first location that covers the opening.

In another preferred embodiment, the frame of the venting apparatus is dimensioned for receipt around a perimeter of a seal around the appliance opening. The frame may be a flexible material that allows the frame to fit or stretch over the seal or an outer perimeter of a wall surrounding the opening, and be secured, via a drawstring, band, elastically grip, etc. This provides for a variety of fits of the venting apparatus for different types and shapes of associated appliances.

In another preferred embodiment, the frame is secured to a perimeter of the screen to form the venting apparatus.

In still another preferred embodiment, the frame has an annular shape. The screen is preferably contoured to fit the washing machine opening (e.g., generally circular, circular, oval, oblong, irregular, etc.) and a perimeter thereof is joined to the annular frame. The frame may be a rigid member. The annular frame is preferably joined to the screen along a perimeter thereof and is dimensioned to be compatible with the washing machine.

The frame and screen of the venting apparatus are preferably formed of rust resistant and/or mildew/mold resistant materials.

The frame material may be one of (i) a rust-resistant metal, (ii) a polymeric material (e.g., plastic or rubber); (iii) flexible/elastic material; and/or combination of such materials or similar materials that address the end use of the venting apparatus.

The screen may preferably be one or more of rust-resistant metal, plastic, or flexible mesh fabric.

In another preferred embodiment, the mounting member is configured to selectively secure the venting apparatus to the housing at a first location that covers the washing machine opening, and may also be used to store the venting apparatus at a second location that can be either located on the washing machine at a location spaced from the opening, or the second location may be remotely located relative to the washing machine, or may be inside the door opening and adjacent the door seal or drum.

There is also provided a method of venting a washing machine wherein the washing machine includes a housing enclosing a cavity, an opening in the housing for loading/unloading clothes in/from the cavity, a door that opens and closes access to the cavity through the housing opening, and a venting apparatus configured for selective receipt over the opening. The method includes opening the door and mounting the screen over the opening when the door is open to allow air flow to the cavity.

In one preferred embodiment, the mounting step includes providing magnets on the venting apparatus and magnetically securing the venting apparatus to the housing in covering relation with the opening. The venting apparatus may be stored on the housing by magnetically attaching the venting apparatus to the housing at a location remote from the opening. This provides for easy and convenient storage.

In another preferred embodiment, the mounting step includes providing a flexible or an elastic frame on the screen and positioning or stretching the frame onto the housing over the opening. The frame may be positioned over the door opening and secured in place or elastically stretched over the door seal. This makes it easy to attach and remove the venting apparatus from the housing over the opening.

Still another version locates the screen assembly inside the door opening (e.g., adjacent the drum or door seal), and may also include a member that interacts with the door latch to prevent the door from inadvertently closing when the screen is deployed.

A benefit of the venting apparatus and method is the ability to allow air flow to the cavity of the washing machine when the washing machine is not being operated.

Another advantage resides in the ease of assembly and use of the venting apparatus.

Still another benefit is associated with the ease of mounting the venting apparatus over the opening, and storing the venting apparatus when not in use.

A further benefit is the ability keep the door open when the venting apparatus is deployed so that air can flow therethrough to the cavity of the housing cavity.

Yet another advantage is the universality of the venting apparatus and method to different manufacturers and models of washing machine.

A still further feature relates to purchasing the venting apparatus with a new machine, or purchasing the venting apparatus as an add-on assembly for an existing washing machine.

Still other benefits and advantages of the present disclosure will become more apparent from reading and understanding the following detailed description.

DETAILED DESCRIPTION

Figure 1:
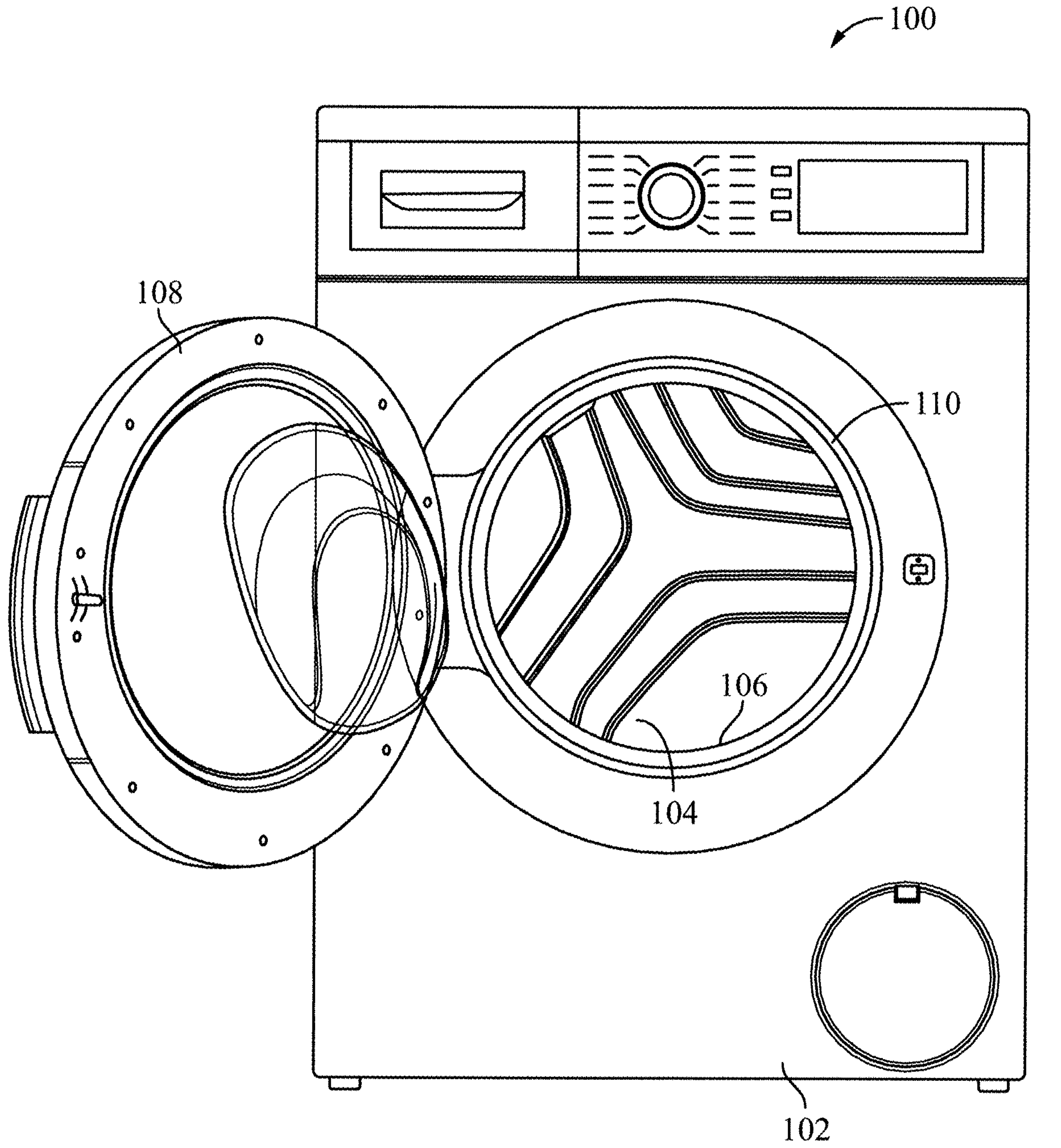
FIG. 1 (Prior Art)
FIG. 1 shows a conventional washing machine with the door in an open position.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms “include” or “may include” used in the present disclosure indicate the presence of disclosed corresponding functions, operations, elements, and the like, and do not limit additional one or more functions, operations, elements, and the like. In addition, it should be understood that the terms “include”, “including”, “have” or “having” used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms “or” or “at least one of A or/and B” used in the present disclosure include any and all combinations of words enumerated with them. For example, “A or B” or “at least one of A or/and B” mean including A, including B, or including both A and B.

Although the terms such as “first” and “second” used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being “connected” or “coupled” to another element, the element may be directly connected or coupled to another element, and there may be an intervening element between the element and another element. To the contrary, it will be understood that, when an element is mentioned as being “directly connected” or “directly coupled” to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Turning to FIG. 1, there is shown a conventional appliance or washing machine 100 that has a housing 102 that encloses a cavity or drum 104 accessed via an opening 106 in the housing. Here, the opening 106 is in a front panel of the housing 102-*a* so-called front load washing machine 100. A door 108 is connected by a hinge to selectively open and close the opening 106 and provide access to the cavity 104 such that clothing items and the like can be loaded and unloaded from the washing machine 100. Typically, a seal 110 is secured to the housing around the opening 106 and when the door is closed (and latched with a conventional door latch), the seal is engaged by the door and effectively seals the cavity 104 during a wash cycle. It is also contemplated that the door 108 may have a seal that can likewise seal the cavity 104. As indicated in the Background, when the washing machine 100 is not operational, the seal 110 prevents air flow to the cavity 104 and this can lead to moisture/mildew issues.

Figure 2:
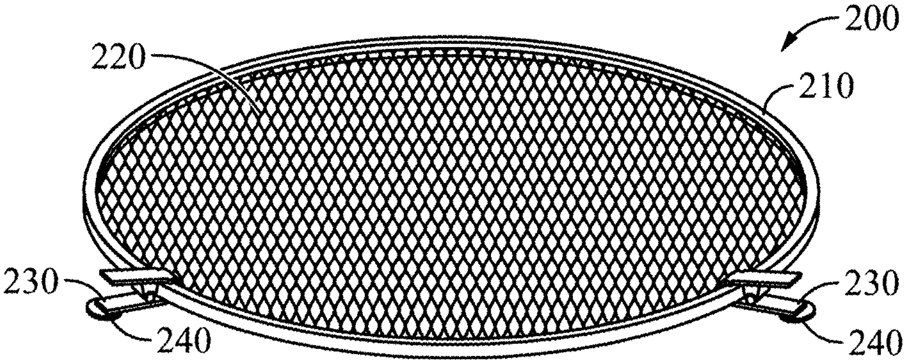
FIG. 2 is a front perspective view of a venting apparatus.
Figure 3:
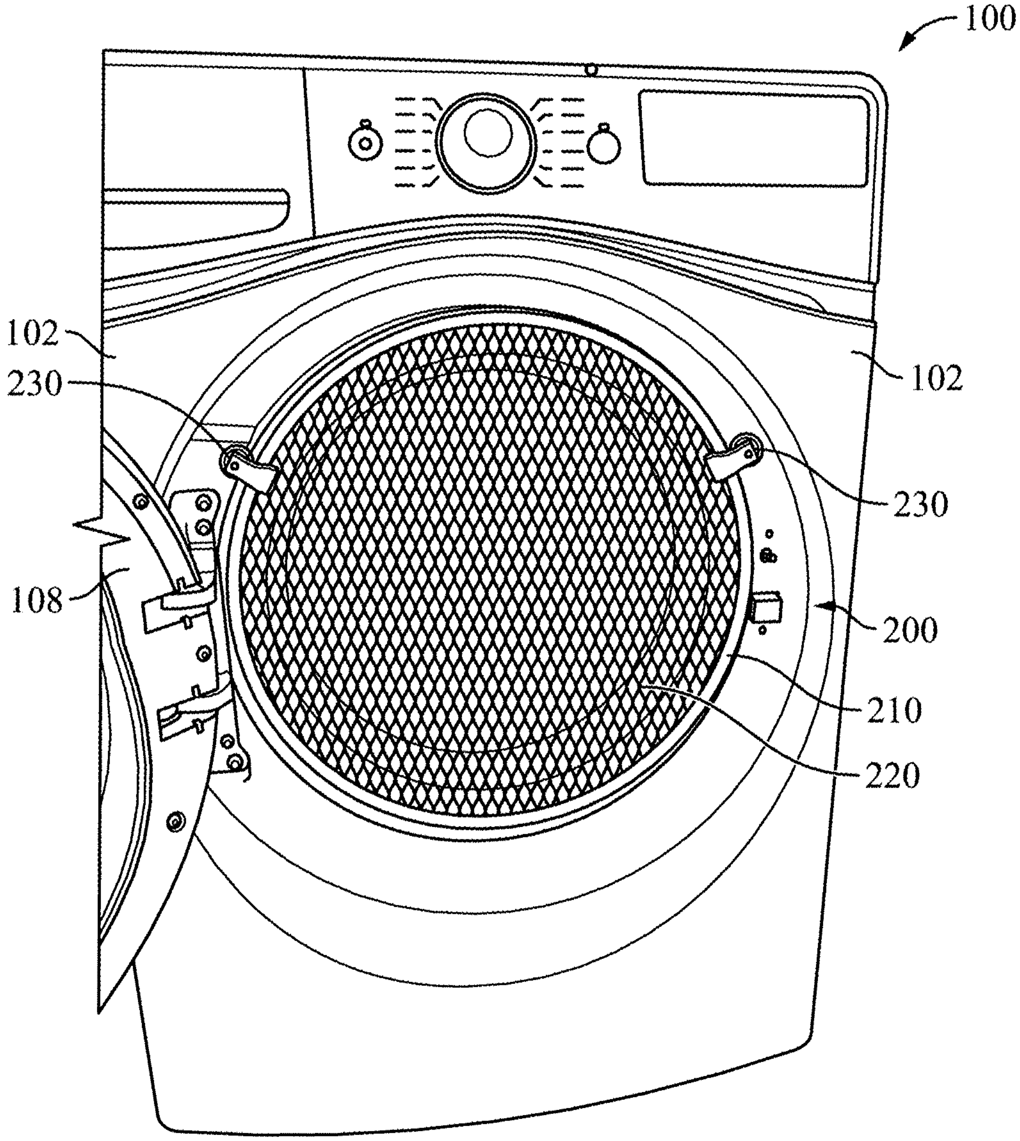
FIG. 3 is a front perspective view of the venting apparatus of FIG. 2 mounted on to vent a washing machine.
Figure 4:
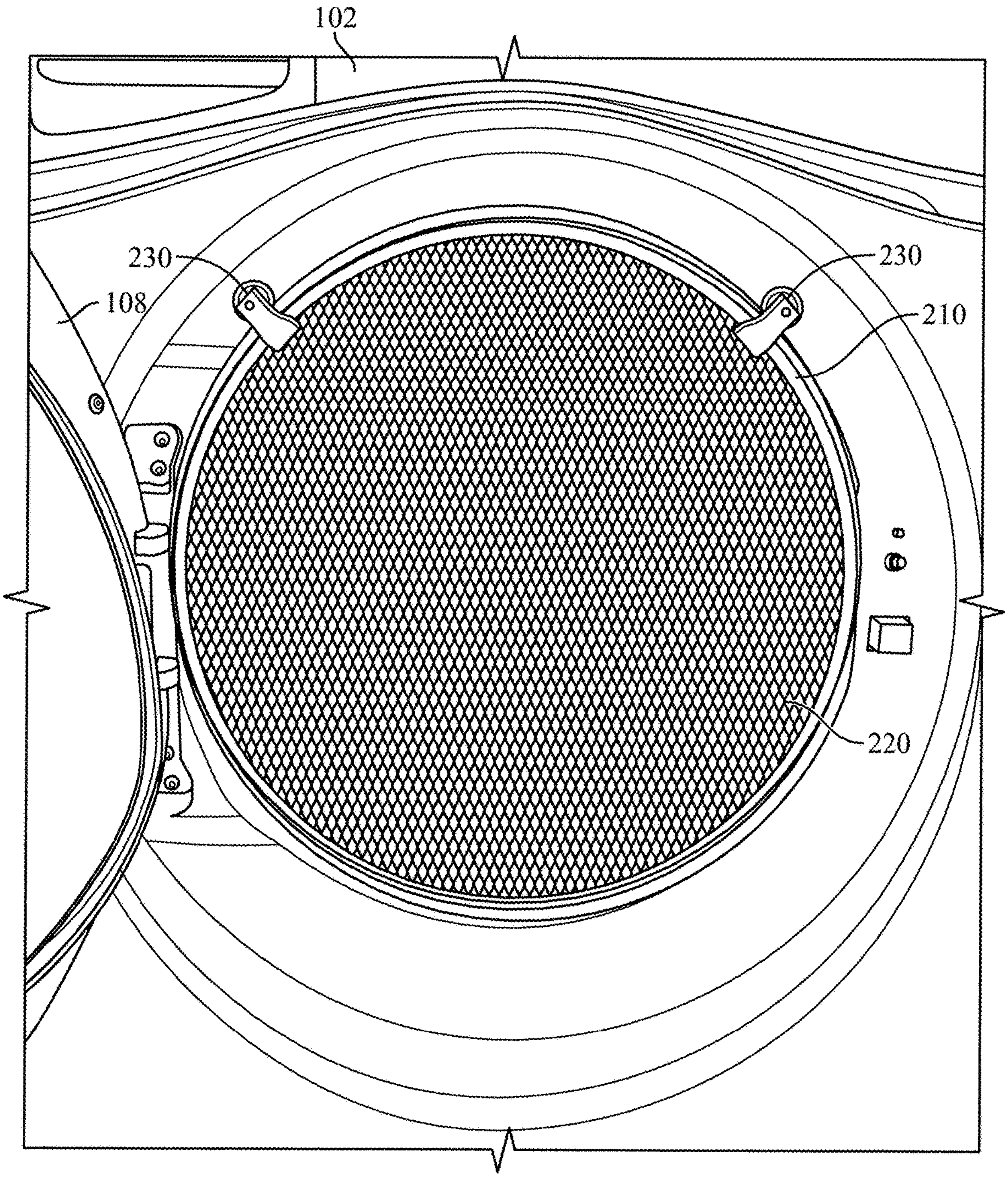
FIG. 4 is an enlarged front view of FIG. 3.

A preferred venting apparatus 200 is shown in FIG. 2 and is also shown in conjunction with a washing machine 100 in FIGS. 2-6. The venting apparatus 200 preferably includes a frame 210 dimensioned to fit the associated opening 106 to the associated washing machine cavity 104. The frame 210 is secured to a perimeter of a perforated screen 220. The perforated screen 220 is secured to the frame 210 and dimensioned to substantially cover the opening 106 when the frame is received over the opening 108 of the washing machine cavity 104. The frame 210 and the screen 220 of the venting apparatus 200 may be formed of a rust resistant material. Also, the frame 210 and the screen 220 may be formed of mildew/mold resistant materials. Thus, the frame 210 and the screen 220 of the venting apparatus 200 may be formed with both rust resistant and mildew/mold resistant materials, or with materials that address both of these properties while still providing desired durability. By way of example, the frame 210 may be one of (i) a rust-resistant metal, (ii) a polymeric material (plastic or rubber); or (iii) elastic material, or a combination of these materials, e.g., a plastic or rubber coated metal. The screen 220 may be one of rust-resistant metal, plastic, or flexible mesh fabric. The screen 220 is perforated to allow air flow into the cavity 104 when the door 108 is in a door open position.

In one preferred embodiment, the frame 210 of the venting apparatus 200 may be dimensioned for receipt (externally) over the washing machine opening 106 and thus when mounted over the opening, the venting apparatus prevents the door 108 from closing over the opening. This allows air flow through the perforated screen 220 and into the cavity 104 via the opening 106. This air communication through the screen 220 of the venting apparatus 200 prevents mold or mildew from developing on the door 108, or in the cavity/drum 104 of the washing machine, and thus prevents unwanted and unpleasant odor from the washing machine 100.

The frame 210 and the perforated screen 220 of the venting apparatus 200 may be any shape and/or dimension to fit an opening 106 (and preferably similarly shaped to fit the opening) of a conventional washing machine 100. The venting apparatus 200 and/or the components 210, 220 of the venting apparatus may be circular, non-circular, etc. to conform to the particular washing machine, or may be sized to fit a large number of different sized and styles of washing machines. The frame 210 in this embodiment is preferably a rigid or substantially rigid member while the screen 220 is likely more flexible since it is perforated and also depending on the material of construction.

The venting apparatus 200 includes a mounting member(s) 230 preferably secured to at least a portion of the frame 210 for removably mounting the venting apparatus 200 to the washing machine 100. The mounting member 230 in one preferred arrangement includes at least one magnet 240 (FIG. 2) secured to the frame 210. The magnet 240 secured to the frame 120 allows the venting apparatus 200 to be removably mounted to the washing machine 102. In one preferred embodiment, there may be two (or) mounting members 230 circumferentially spaced apart, for example, approximately ninety degrees apart from each other and about the perimeter of the frame 120. One skilled in the art will also understand that additional mounting members 230 may be circumferentially spaced apart at a variety of distances depending on the dimensions of the opening 106 and the housing 102 of the appliance 100. Of course, one skilled in the art will understand that different types and styles of mounting members 230 may be used, the mounting members may be removably secured to the frame 210, the frame may be formed/impregnated with a magnetic material to allow the frame to directly contact the metal housing.

The venting apparatus 200 of FIGS. 2-6 also advantageously prevents the door 108 from closing over the opening 106. The venting apparatus 200 has the added benefit of acting as a barrier that deters pets or young children from entering through the opening 106.

Figure 5:
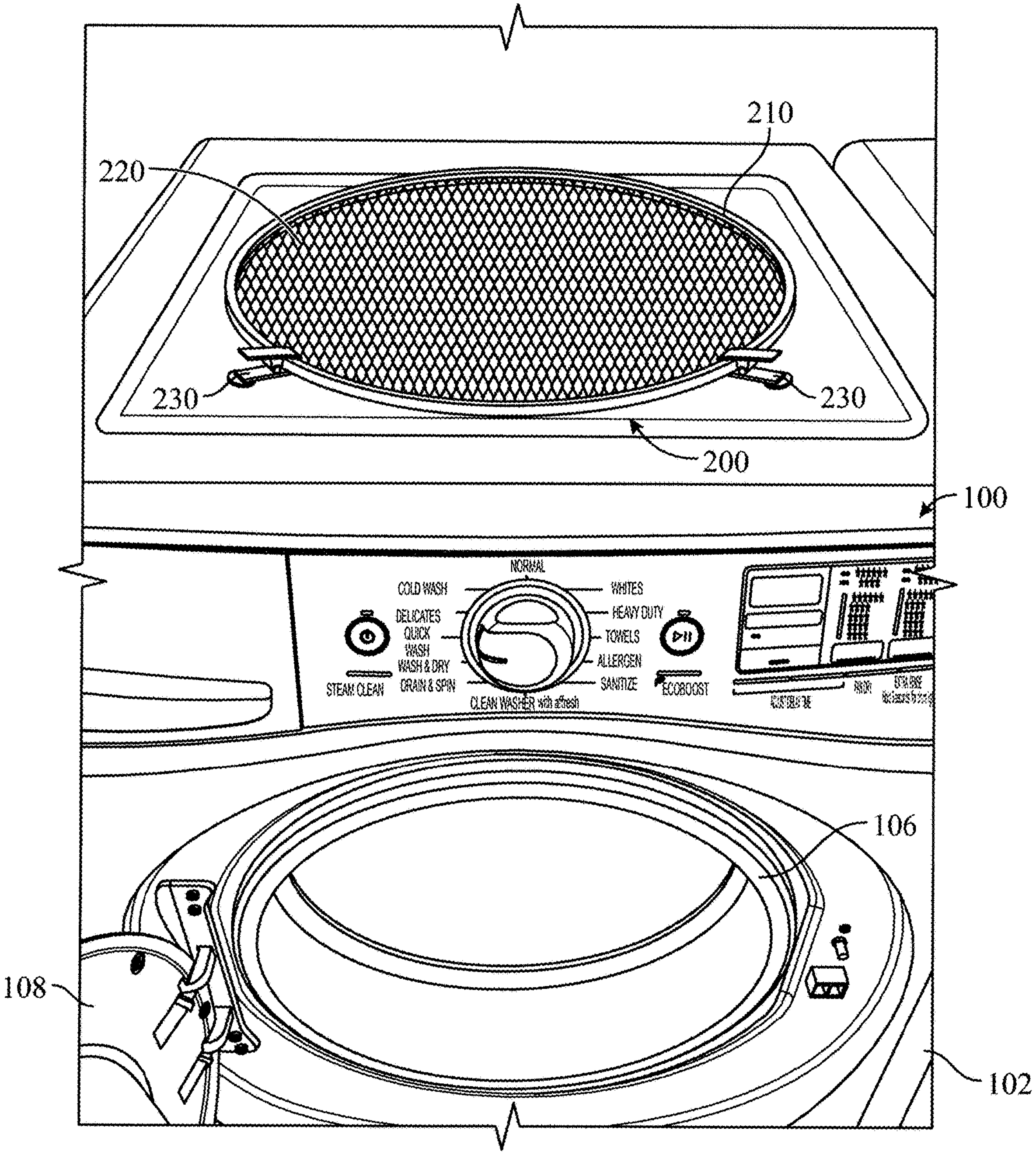
FIG. 5 is a perspective view showing the venting apparatus stored on an upper surface of the washing machine.
Figure 6:
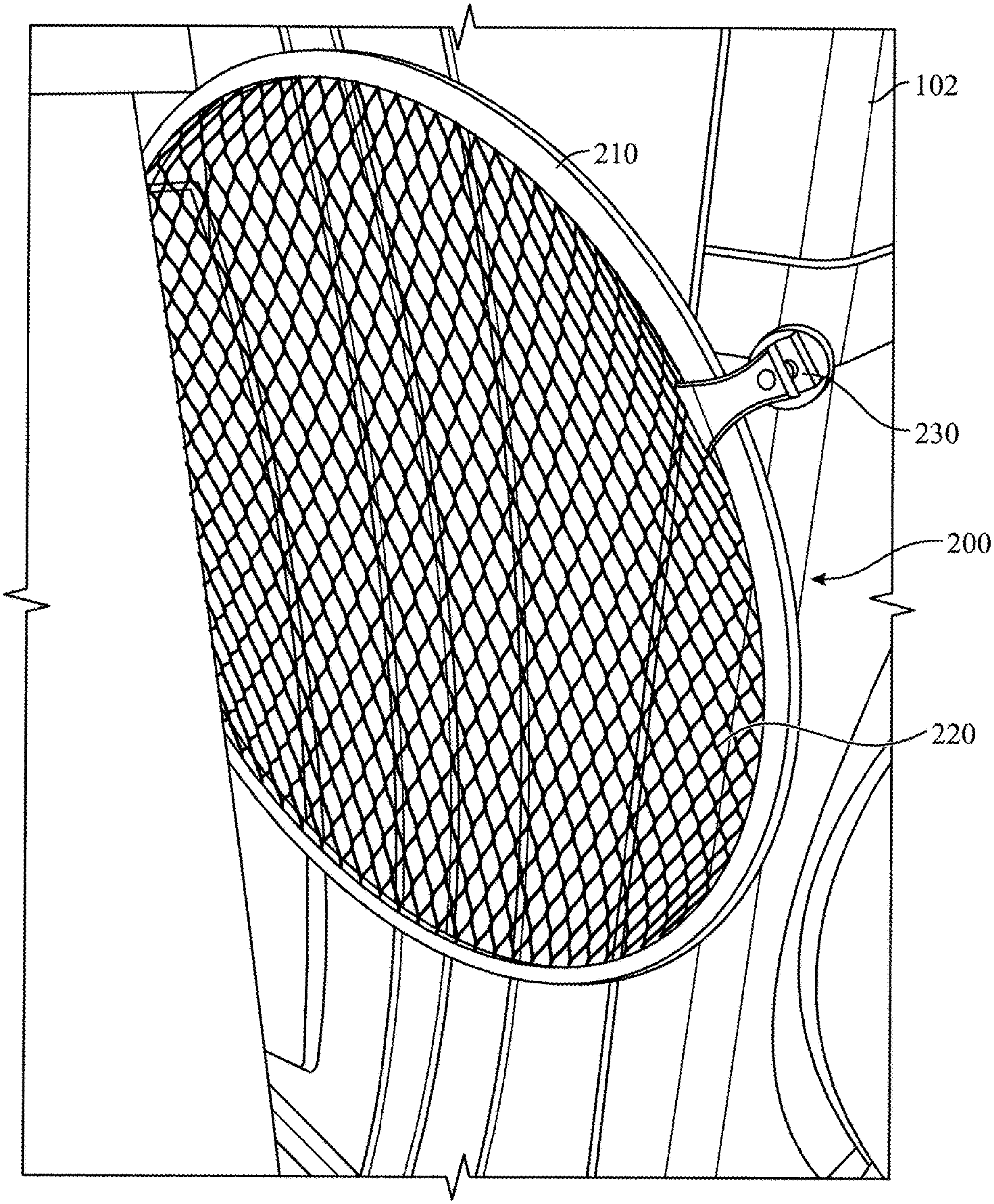
FIG. 6 is a perspective view illustrating the venting apparatus stored at an alternate location on the washing machine.

FIGS. 5 and 6 show alternate locations on the washing machine housing 102 to store the venting apparatus 200. Of course, the venting apparatus may also be stored at a location remote from the washing machine if desired (e.g., cupboard, shelf, etc.).

Figure 7:
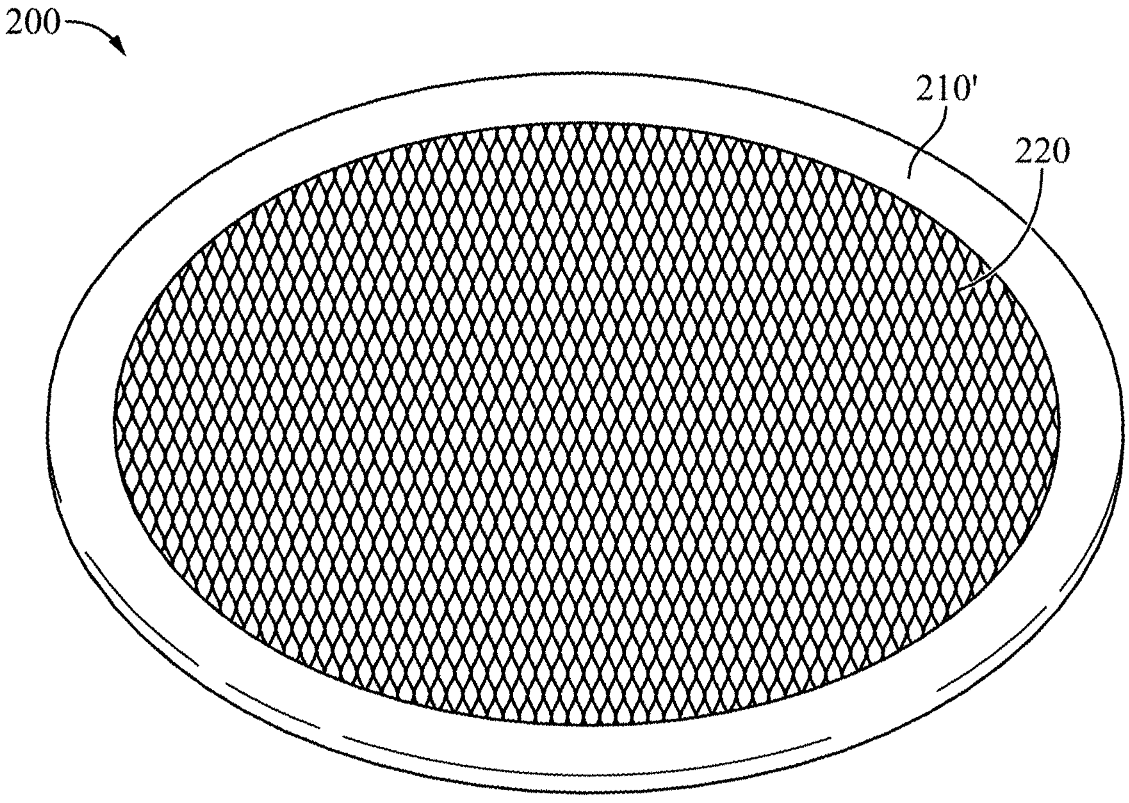
FIG. 7 is a perspective view of another embodiment of the venting apparatus.

In another preferred embodiment shown in FIG. 7, the frame 210' may be dimensioned for receipt around a perimeter of the opening or seal 110 around the associated appliance opening 106. The frame 210' may be an elastic material that may be stretched for receipt around the perimeter of the seal 110 or around the perimeter of a housing flange that holds the seal. This allows the washing machine opening 106 to be temporarily covered by wrapping the frame 210' around the opening 108 where the elastic properties then retain the venting apparatus 200 in place. Similarly, the elastic frame 210' can be stretched/expanded to remove the venting apparatus 200. Alternately, the frame of the venting apparatus 200 can be formed from a non-elastic material that is still sufficiently flexible for receipt over the opening, while still positioning the screen over the opening 106 and without departing from the scope and intent of the present disclosure.

Figure 8A:
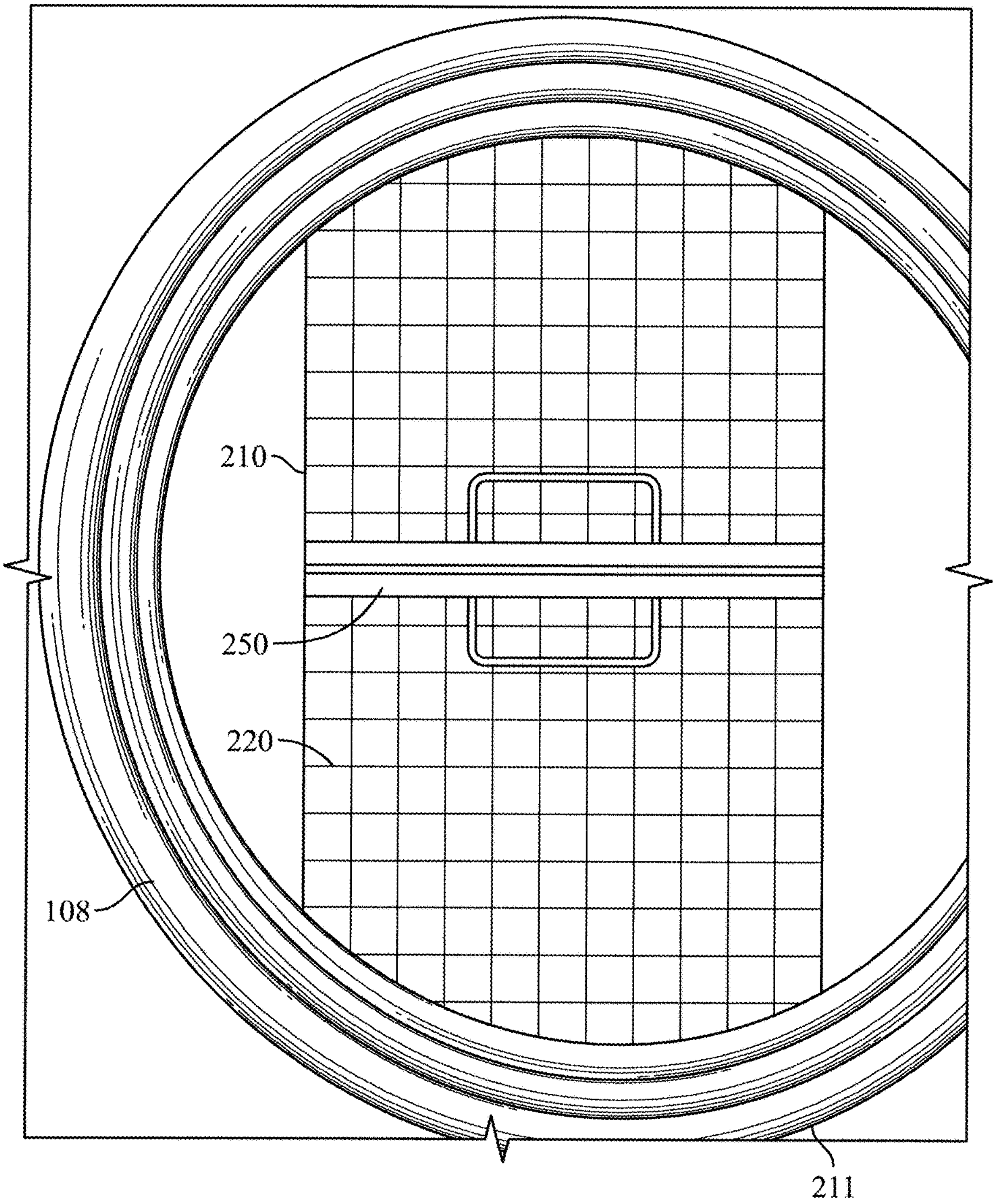
FIGS. 8*a*-8*c* are perspective views of another embodiment of the venting apparatus.
Figure 8B:
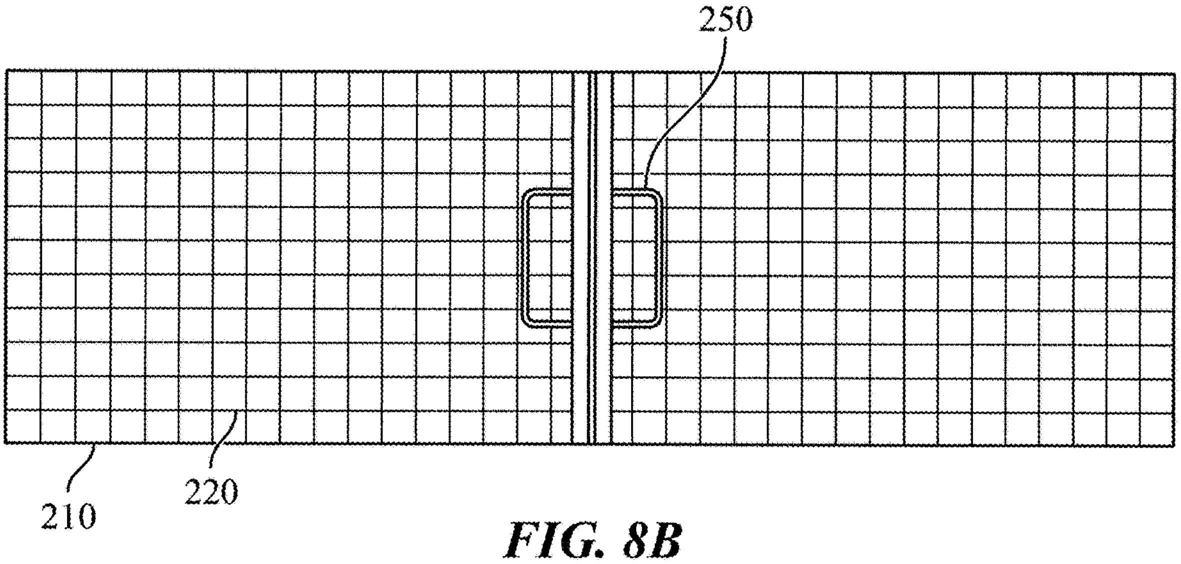
Figure 8C:
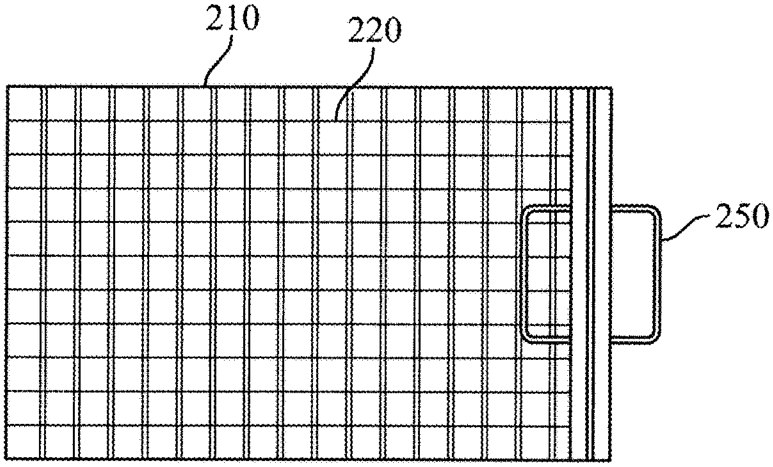

In another preferred embodiment shown in FIGS. 8A-8A, the frame 210 includes a screen 220 and a locking mechanism 250. The frame 210 may be configured for receipt inside the washing machine housing. For example, the frame could be mounted on an interior surface of the housing adjacent the door opening or mounted or secured into the lip 211 of the door gasket 108 such as at top and bottom portions of the lip 211 of the door gasket in a vertical position. The frame 210 may also be configured for receipt in the lip 211 of the door gasket 108 at the right or left portions of the door gasket 108 in a horizontal direction. Once the edges of frame

210 are secured adjacent or in the seal lip, a locking mechanism 250 locks the frame 210 in place over the associated appliance opening 106. In one embodiment, the locking mechanism 250 can be a hinge that locks into place in the frame 210 into the top 211 of door gasket. The frame 210 is configured to folded in half at the locking mechanism 250 in order to store the apparatus more easily. In this way, the screen 220 can either be placed and attached to the outside of the washing machine door 108 or it can be placed inside the washing machine door such as into the lining of the drum gasket 104 or door seal. The frame 210 and screen 220 can be made of plastic or metal. The locking mechanism 250 can also be made of plastic or metal. In addition, if the venting apparatus is mounted interiorly in the housing, the venting apparatus may include an additional member that prevents the door from remaining closed when the venting apparatus is deployed. For example, an extending protrusion member could extend to the door latch to prevent the door from latching in a closed position.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

I claim:

1. An apparatus for venting an associated front loading appliance where the associated appliance includes an associated housing having an associated cavity formed therein and accessible via an associated opening that opens through a front panel in the associated housing, and the associated appliance having an associated door dimensioned to cover the associated opening wherein the associated door selectively permits access to the associated cavity in a door open position, and selectively prevents access to the associated cavity in a door closed position, the venting apparatus comprising:

- a frame dimensioned to fit the associated opening to the associated appliance cavity; and
- a perforated screen secured to the frame and dimensioned to substantially cover the associated opening when the frame is fit over the associated opening of the associated appliance cavity;
- a mounting member secured to at least a portion of the frame for removably securing the frame to the front panel of the associated appliance housing, wherein the mounting member includes at least one magnet secured to the frame that removably magnetically mounts the apparatus to the front panel of the associated appliance housing, wherein said at least one magnet of the mounting member selectively magnetically secures the venting apparatus at a first location on the associated appliance housing front panel where the frame is received over the associated opening and the perforated screen covers the associated opening such that the venting apparatus when located in the first location prevents the associated door from closing over the associated opening.

2. The apparatus of claim 1 wherein the at least one magnet of the mounting member is configured to selectively magnetically secure the venting apparatus to the associated appliance housing at a second location where the screen is spaced from the associated opening.

3. The apparatus of claim 1 wherein the frame is formed of a rust resistant material.

4. The apparatus of claim 3 wherein the screen is formed of a rust resistant material.

5. The apparatus of claim 1 wherein the frame and screen are formed of rust resistant and mildew/mold resistant materials.

6. The apparatus of claim 1 wherein the frame is secured to a perimeter of the screen.

7. The apparatus of claim 1 wherein the frame is one of (i) a rust-resistant metal, (ii) a polymeric material (plastic or rubber); or (iii) elastic material.

8. The apparatus of claim 1 wherein the screen is a mildew/mold resistant material.

9. The apparatus of claim 7 wherein the screen is one of rust-resistant metal, plastic, or flexible mesh fabric.

10. The apparatus of claim 1 wherein the frame is dimensioned for receipt around a perimeter of an associated seal around the associated appliance opening.

11. The apparatus of claim 1 wherein the frame is annular.

12. The apparatus of claim 11 wherein the screen is circular and a perimeter thereof is joined to the annular frame.

13. The apparatus of claim 11 wherein the frame is a rigid member.

14. A method of venting a front loading washer wherein the washer includes a housing enclosing a rotatable drum, an opening in a front panel of the housing for loading/unloading clothes in/from the drum, a door that opens and closes the housing opening, and a screen configured for selectively receipt over the opening, the method comprising:

- opening the door; and
- magnetically mounting a venting apparatus in a first location over the opening when the door is opened to allow air flow to the drum, said venting apparatus comprising:
  - a frame dimensioned to fit over the opening; and
  - a perforated screen secured to the frame and dimensioned to substantially cover the opening when the frame is fit over the opening;
  - a mounting member secured to at least a portion of the frame for removably securing the frame to the front panel of the front loading washer, wherein the mounting member includes at least one magnet secured to the frame that removably magnetically mounts the apparatus to the front panel, wherein the at least one magnet selectively secures the venting apparatus at said first location on the front panel such that the venting apparatus when located in the first location prevents the associated door from closing over the associated opening.

* * * * *